Figure 1:
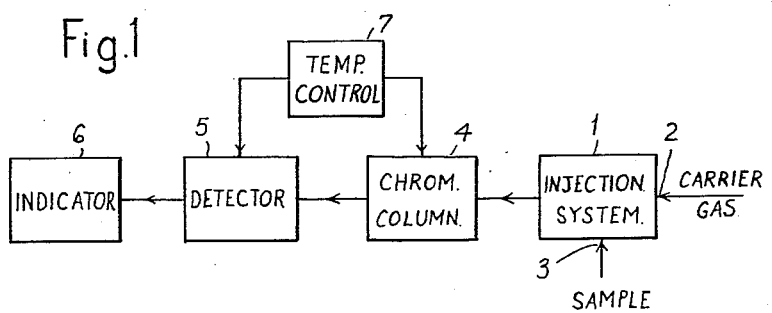

Jan. 21, 1964 P. JENKINS 3,118,300
LIQUID SAMPLING APPARATUS FOR GAS CHROMATOGRAPHY
Filed April 19, 1961 2 Sheets-Sheet 1

Inventor
Philip Jenkins
By
Attorneys

Jan. 21, 1964 P. JENKINS 3,118,300
LIQUID SAMPLING APPARATUS FOR GAS CHROMATOGRAPHY
Filed April 19, 1961 2 Sheets-Sheet 2
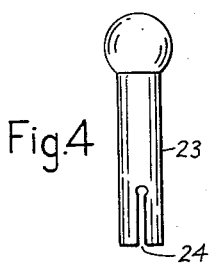
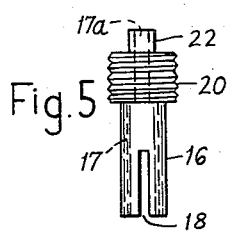
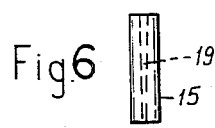
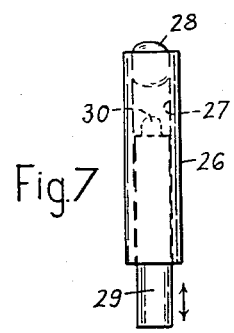
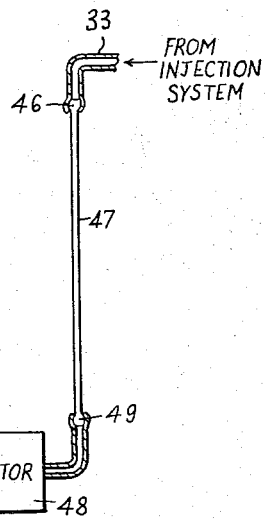
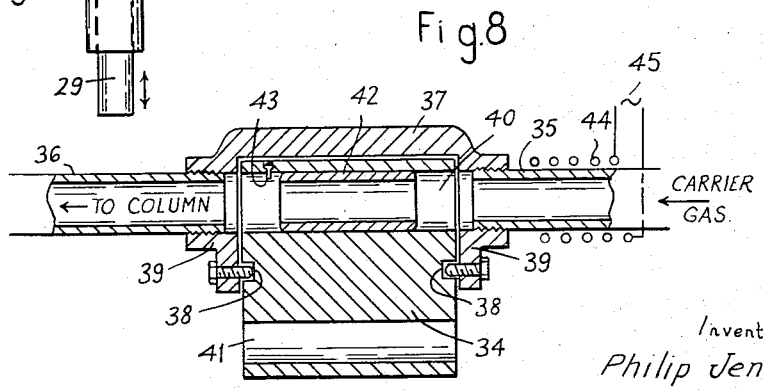
Inventor
Philip Jenkins
By
Attorneys United States Patent Office 3,118,300
Patented Jan. 21, 1964

3,118,300
LIQUID SAMPLING APPARATUS FOR GAS CHROMATOGRAPHY
Philip Jenkins, Cambridge, England, assignor to Pye Limited, Cambridge, England, a British company
Filed Apr. 19, 1961, Ser. No. 104,120
Claims priority, application Great Britain Apr. 21, 1960
9 Claims. (Cl. 73—23)

The present invention relates to gas liquid partition chromatography and particularly to a method and means of introducing very small liquid samples into the carrier gas stream prior to the passage of the latter into the chromatograph column.

The technique of gas chromatography applied to liquids requires the addition of a small volume of the liquid to the upper part of the chromatograph column. In simple applications where only qualitative results are required it is sufficient to add this small sample without paying any attention to the uniformity of the original bulk of liquid and taking no precautions to preserve the ratios of the components of the sample during the addition. However, many applications require that the ratios of the components in the added sample be representative of the bulk mixture and that there be no preferential losses during the addition of the sample. There are many ways of introducing the sample: for example the upper part of the chromatograph column may be provided with a serum cap, that is to say an aperture capped with a diaphragm of rubber or other similar material through which a hypodermic syringe may be introduced for injection of the sample.

The losses which are referred to above occur mainly as a result of evaporation of a part of those components of the mixture that have a lower boiling point, during the transference of the sample to the apparatus. It will be apparent that it is likely to be more difficult to preserve a constant sample when the sample is very small since any preferential losses during sampling will represent a much greater percentage change than in the case of large samples.

Many techniques have already been described for liquid sampling on conventional gas chromatograph columns. By suitably choosing the system, samples down to 100 micrograms can be constantly sampled. The most difficult situation for such conventional column chromatographs occurs when highly sensitive detectors are being used, and one of the most satisfactory systems is that devised by R. P. W. Scott of Benzol Producers, and generally known as the "Scott System," involving the use of a self-discharging micropipette which can be used with quantities as small as 100 micrograms.

At this stage it is convenient to refer to the problems experienced when attempting to introduce minute samples of predictable quantity into the carrier gas stream, and these may be tabulated as follows:

(1) The introduction of air with the sample which tends to oxidise the column itself.

(2) The evaporation loss in transferring the sample into the column.

(3) The evaporation loss will not only affect the quantity of the introduced sample but also its quality because different components of the sample may well have different boiling points, as referred to above, and therefore as the evaporation loss becomes significant there will be a preferential loss due to the more rapid evaporation of the components having the lower boiling point.

(4) Difficulty in completely emptying the pipette containing the sample.

As a recent technique it has been proposed to use chromatographs in which the separating column comprises a capillary tube having a thin stationary phase coating on the wall surface. This can be used efficiently with very small sample quantities of the order of 1 microgram but the problems referred to above become much more acute.

Reference has been made above to the use of a micropipette, for example for the addition of samples of 100 micrograms; such a micropipette would have an internal diameter of only four thousandths of an inch and the application of such micropipettes for use with capillary chromatographs (requiring a sample size of the order of 1 microgram) does not seem to be possible owing to the enormous mechanical difficulties involved in the making and use of the very tiny capillaries.

For this reason a number of techniques have been applied which enable these very small samples to be taken and these techniques have made use of two general principles. In the first of these, a sample is introduced by a micropipette or a hypodermic syringe into a chamber located before the column and through which the carrier gas passes both into the column and also into a side arm which allows up to 99.9 percent of the gas to escape to atmosphere. A heater surrounds the chamber so as to heat the introduced sample. The sample is split according to the ratio of the two flows, and by having a very large escape to atmosphere, very small samples can be applied to the column and the detector located at the output thereof. The sample introduced into such a splitting system is generally of the order of 500 micrograms. In the second of these principles, a vapourising chamber is provided with a heater and the sample is injected by hypodermic syringe through a serum cap fitted to this chamber, the chamber being connectable to the column by means of a valve inserted in the line carrying the carrier gas to the column. The heater is arranged to produce sufficient heat to effect rapid vaporisation of the entire sample within the chamber and only a small proportion of it is used for injection into the gas stream. Since a vapour occupies approximately one thousand times the volume of a liquid, the one microgram sample required by the capillary tube of the chromatograph column can be taken as a volume of about 1 microlitre of gas and therefore such sampling units are relatively easy to make and have already found considerable application as gas sampling devices.

The first splitting system referred to suffers from a number of disadvantages, the three most important of which are as follows:

(1) The system requires rapid vaporisation of the sample prior to the splitting and this involves the use of injection temperatures above that prevailing in the column arrangement, said temperatures being produced by the heater referred to. As a result of this there is an increased likelihood of thermal disruption of the components of the sample.

(2) The rapid vaporisation encourages molecules of the sample to move great distances, even against the flow of the carrier gas, and this results in the broadening of component bands or even total loss of parts of the sample.

(3) The ratio of splitting is mainly governed by the percentage of carrier gas vented to the atmosphere and is generally arranged to be of the order of 1000:1. The actual splitting ratio however depends also on the viscosity of the gas admitted to the splitting device itself. In such a splitting device, the lightest components will be vaporised fractionally before the heavier components and since the sample is very concentrated in the carrier gas at this point, the splitting device will receive a rapidly changing sample at high concentration. The viscosity of this rapidly changing mixture is unlikely to be constant and therefore the precise splitting ratio will vary with the nature of the components.

The second principle, utilising the evaporation technique followed by direct vapour sampling, is better than the splitting technique but the temperature restrictions are again very severe and the technique is not suitable for other than mixtures of quite low boiling points. There will moreover be preferential absorption loss on the walls of the chamber which loss is comparatively large.

In order to seek a remedy for all these disadvantages, the present invention proposes a method having the following features:

(a) The sample is directly added to the gas flow into the chromatograph capillary without any splitting thereof;

(b) The sample is not subjected to temperatures more than 5 to 10° above the temperatures prevailing in the column itself;

(c) The heater system employed for heating the sampling unit is arranged so that it does not convey heat pulses through the column and hence to the detector such as are experienced with the vaporisation technique referred to above; and (d) The system ensures that the flow to the column of the detector be interrupted for a very short time, of the order of one second or less, and that as little air as possible shall be allowed into the column. The first of these features eliminates sampling errors due to splitting; the second feature greatly reduces the chance of thermal disruption of the components and minimises the great dispersion of the more readily volatisable constituents; the third and fourth features enable a good base-line stability to be achieved on the unit and constancy of retention times with no oxidation of the stationary phase on the column.

Accordingly the invention consists in a method of introducing small samples of liquid into a carrier gas for passage through a gas chromatograph column in which a capillary tube is first filled with a quantity of the liquid and is then almost completely discharged of the liquid to leave a residue coating the walls thereof, and the tube with said residue coating the walls thereof and forming the sample is introduced into the gas stream passing through to the chromatograph column, heat being applied to the sample, so that the gas completely removes the sample from the walls of the capillary tube.

The capillary tube may be a so-called self-discharging capillary tube having the properties of retaining within it a constant quantity of the liquid of the order of 1 microgram.

One convenient way of almost completely discharging the capillary tube is to touch one end thereof on an absorbent surface such as filter paper.

It will be found that the amount of residue is substantially constant for different samples of the same liquid or liquids having the same viscosity, whereby the analysis can be repeated uniformly provided that the capillary tube is inserted into the gas stream as soon after discharging as possible.

The heat may be applied to the sample either directly, or from the carrier gas which may be preheated for this purpose by a separate heater or by routing the incoming carrier gas though the column heater, as the temperature need may be substantially comparable to the temperature of the column.

In one method of introducing the small samples of liquid into a carrier gas for passage through a gas chromatograph column according to the invention, the capillary tube containing the sample residue is placed in a body or chamber located adjacent the gas conduit to the column, said body or chamber being moved when desired to bring the sample residue into contact with the carrier gas stream for injection into the chromatograph column.

The invention also consists in apparatus for introducing small quantities of liquid into a carrier gas for passage through a gas chromatograph column, comprising a rotatable body having a pair of passages therein, one of which is adapted to receive a container containing the liquid sample, said body being movable so that either one of said passages may be connected into a conduit carrying the carrier gas whereby the liquid sample may be introduced into the carrier gas at will.

Figure 2:
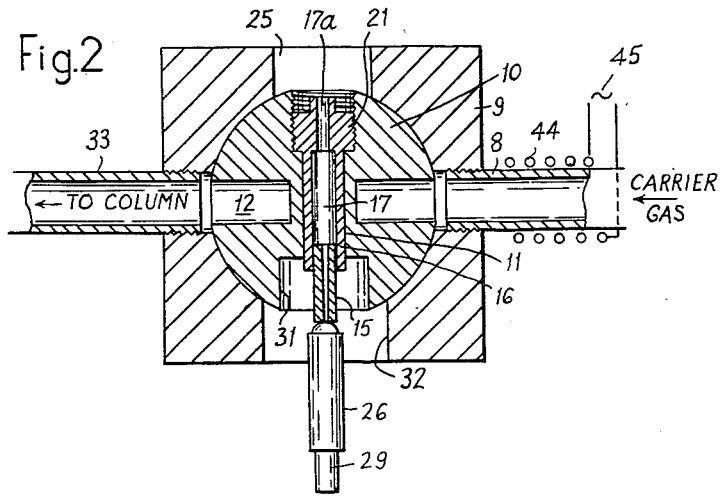
Figure 3:
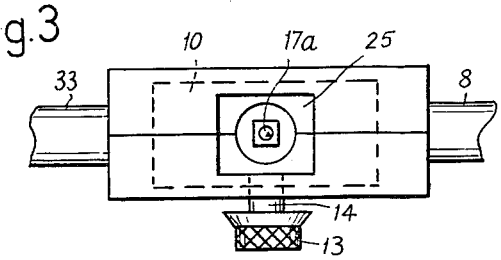

In order that the invention may be more clearly understood, reference will now be made to the accompanying drawings which show some embodiments thereof by way of example and in which:

FIGURE 1 shows a flow diagram of the most important integers of a complete gas chromatography system, FIGURE 2 shows a simplified section through one embodiment of sample-injection system, FIGURE 3 shows a plan view of the arrangement of FIGURE 2, FIGURE 4 shows a view of a spanner for inserting the sample holder into a rotatable body, FIGURE 5 shows a view of a holder for a micropipette for containing a sample, FIGURE 6 shows a view of the self-discharging micropipette itself, FIGURE 7 shows a view of a discharging device, FIGURE 8 shows a cross-section through another embodiment of injection system, and FIGURE 9 shows a diagrammatic representation of a capillary chromatograph column and associated detector.

Referring to the drawings, FIGURE 1 shows a flow diagram in block form of the major parts of a complete chromatograph analysis system. The sample-injection system is schematically represented at 1, positioned to receive a carrier gas and a liquid sample as indicated by the arrows 2 and 3 respectively. After passing through the injection system the carrier gas, now carrying the liquid sample, is passed through a chromatograph column indicated at 4 and thence through a detector indicated at 5, the output from the detector 5 being indicated on an indicator 6. The present invention relates only to the sample-injection system at 1.

In order to control the temperature of the flow as between the chromatograph column 4 and the detector 5, a suitable temperature control device, schematically illustrated at 7, is interposed between the column and the detector.

FIGURE 2 shows a first embodiment of a sample-injection system, comprising a horizontal conduit 8 for passing the carrier gas to the gas chromatograph column, which is preferably a capillary type, and fitted in this conduit is a chamber 9 which receives a plug or valve body 10 that is bored with two bores at right angles at 11 and 12 respectively. The two bores 11 and 12 are locally deformed at their central portions so that each passes behind the other, so that therefore the drawing is not a true cross-section: it is shown in this fashion purely for convenience in drawing. Either one of the bores 11 and 12 is positionable in continuity with the conduit 8 by rotation of the valve body 10 for example by means of a control knob 13, mounted at the end of a shaft 14 which is secured to the said body and passes through the wall of chamber 9.

In order to introduce a liquid sample into the gas stream that is passing through the chamber, a micropipette 15 of the capillary self-discharging type containing the sample in the form of a residue coating the walls thereof, is loaded vertically into the bore 11 whereafter rotation of the valve body 10 will allow the micropipette to be placed in continuity with the conduit 8 so that the sample will be introduced into the gas flow by capillary action. This rotation takes less than one second. A further rotation of the valve body 10 after the analysis has been effected allows the used pipette to be withdrawn from the valve body. A holder 16 for the micropipette is provided which may be inserted into the bore 11 and reference will now be made to FIGURES 4 to 7 for further details thereof.

In FIGURE 5 is shown a view of the holder device which comprises a shank 16, having a central bore 17 which is of restricted diameter at the upper end 17a to prevent the capillary tube from passing therethrough.

The other end of the holder is slotted at 18 so that the ends of the holder may be pressed together after the micropipette 15, having a capillary bore 19 and shown in FIGURE 6, is inserted therein. The micropipette 15 is then retained within the holder 16 but can be pulled out so that it extends for some distance out of the holder and is held by the springiness of the slotted end of the holder. Near one end of the holder there is provided a portion of larger diameter at 20 which is externally screw-threaded so as to be received in an internally threaded recess 21 in the valve body 10. Above the portion 20, the holder is provided with an extending central stem 22 proportioned so as to be grippable by a spanner shown at 23 in FIGURE 4. Spanner 23 has an end slotted portion at 24 to fit over the stem 22 to allow the holder to be inserted into the valve body by being passed through an upper mouth 25 thereof, shown in FIGURES 2 and 3.

FIGURE 2 shows the micropipette 15 extending out of the holder 16 so that it may be discharged.

In order to discharge the micropipette use is made of an auxiliary tool which comprises two pieces and is shown in FIGURE 7. A metal cylinder 26 has an internal bore 27 and the upper end is plugged with several layers of filter paper or a wad of absorbent material shown at 28. A pusher member 29 is inserted into the bore 27 so that its tip 30 may contact the wad 28 and press it against the lower end of the micropipette 15.

In order to introduce a small sample using the equipment referred to above the method of operation is as follows:

A. The micropipette 15 is firstly inserted into the holder 16 and adjusted by pulling on the end so that it projects out of the holder for a sufficient length for the contents of the tube to be readily visible.

B. The micropipette is then charged by immersing its projecting tip below the surface of the liquid to be analysed for a sufficient time for the liquid to flow up into the capillary bore 19 and be retained there. Preferably the outside walls of the micropipette are wiped clean.

C. The micropipette 15 and the holder 16 are then inserted into the valve body through the mouth 25 of the chamber 9 and secured in position by applying the spanner 23 to the stem 22 of the holder and screwing it home in the recess 21. At this stage the micropipette 15 will extend beyond the holder and therefore extend out of the end of the passage 16 in the valve body and through the recess 31 thereof and the lower open mouth 32 of the chamber 9, as shown in FIGURE 2.

D. The micropipette is now discharged by the auxiliary tool 26, 29. The pusher member 29 is pressed against the wad 28 so that the outer end of the latter is bowed out and the tube 26 is then held against the capillary 19 which will then discharge leaving a film of liquid on the wall of the capillary. Because the micropipette is projecting from the valve body 10 this operation can be visibly checked. When the capillary 19 is seen to be fully discharged the micropipette is pushed back into the holder 16 by applying extra pressure to the tool 26.

E. The valve body 10 is then turned through 90° by rotation of the knob 13 to bring the sample into the gas flow by registering the bore 11 with the conduit 8 and the conduit 33 leading to the gas column.

The valve body 10 is preferably made from chemically inert and heat insulating material such as polytetrafluoroethylene (PTFE). A typical micropipette 15 may have a length of 1 cm. and an outer diameter of the order of 2 mm. and the internal capillary bore thereof is tapered in conventional fashion to provide the "self-discharging" feature. The proportional dimensions, however, depend mainly upon the nature of the sample to be analysed and to a lesser extent upon the carrier gas, temperature and rate of flow of the apparatus as a whole.

If the mipropipette 15 were a perfect fit in its bore in the holder and the latter were a perfect fit in its bore in the valve body 10, then all the carrier gas must flow through the capillary tube 19 and this would result in the fastest emptying of the micropipette and hence the narrowest peaks on the recording apparatus 6 connected to the detector 5. For ease of handling and manufacture it is, however, possible to allow normal fitting as the reduction in efficiency with any normal leakage of the gas past the micropipette is negligible.

FIGURE 8 shows a second embodiment of sample-injection system according to the invention in which the valve body 34 is in the form of a chamber revolvable on a substantially horizontal axis somewhat similarly to a revolver. The axis of revolution may be parallel to the conduit 35 feeding in the carrier gas and the conduit 36 leading to the chromatograph column. The chamber 34 is mounted within a housing 37 upon a pair of pins 38 which pass through depending walls 39 of the housing.

The chamber is bored at 40 and 41 so that in one position, i.e. the position shown in FIGURE 8 the bore 40 is in line with the conduits 35 and 36 to allow the carrier gas to pass through the micropipette 42 located in the bore 40. In order to retain the micropipette 42 in position a spring-loaded pin 43 may be provided which passes through the wall of the revolvable chamber 34. Any other stop arrangement may be provided. If desired the bore 41 may be of horseshoe section to decrease the obturation time of the gas flow during rotation of the chamber 34.

In order to load the chamber 34 with a micropipette carrying the liquid sample, the chamber 34 is rotated by hand from the outside until the bore 40 is in the position shown in the drawing for bore 1 i.e. clear of the walls 39. In the embodiment shown the micropipette is loaded into the chamber 34 from the right and may be pushed inwards by a tool somewhat similar to the press member 29 shown in FIGURE 7 until it contacts the pin 43. The chamber 34 is then rotated to the position shown to allow the carrier gas to pass through the pipette 42. After the samping has been effected the chamber 34 is again rotated to bring the bore 40 to the lowermost position and the micropipette can then be ejected by using the tool from the opposite end.

The chamber 34 may, if desired, be mounted on an axis which is not parallel to the conduits 35 and 36 but obliquely related thereto so that the ejection of the micropipette is assisted by gravity since in the lowermost position the bore 40 will thus slant downwardly. The revolvable chamber 34 may be about ½" long.

In both the embodiments above described a preheating coil 44 surrounds the conduit 8 or 35 respectively prior to the ejection device so as to render the temperature of the sample about 5 to 10° higher than that of the chromatographic column. The coil 44 may be energised by any convenient source schematically illustrated by an A.C. source 45.

FIGURE 9 shows somewhat diagrammatically, a chromatograph of the kind with which an injection system according to the invention would be used.

The conduit 33 (or 36) from the injection system is connected by a reducing nipple 46, to a chromatograph column 47 having a capillary-dimension bore. After passing therethrough, the carrier gas and sample pass into a detector cell or chamber, schematically illustrated at 48, via a nipple 49.

It will be understood that the drawings are not to scale.

I claim:

1. A method of introducing small samples of liquid into a carrier gas for passage through a gas chromatograph column, comprising the steps of first filling a capillary tube with a quantity of the liquid, then almost completely discharging the liquid from said tube to leave a residue coating the walls of said tube, introducing said tube with said residue coating the walls thereof and forming the sample into the gas stream passing through to the chromatograph column, and applying heat to said sample so that the gas completely removes the sample from the walls of the capillary tube.

2. A method of introducing small samples of liquid into a carrier gas for passage through a gas chromatograph column, comprising the steps of first filling a capillary tube with a quantity of the liquid, then almost completely discharging the liquid from said tube by touching one end of said tube on an absorbent surface to leave a residue coating the walls of said tube, introducing said tube with said residue coating the walls thereof and forming the sample into the gas stream passing through to the chromatograph column, and applying heat to said sample so that the gas completely removes the sample from the walls of the capillary tube.

3. A method of introducing small samples of liquid into a carrier gas for passage through a gas chromatograph column, comprising the steps of first filling a capillary tube with a quantity of the liquid, then almost completely discharging the liquid from said tube to leave a residue coating the walls of said tube, placing the said tube with said residue coating the walls thereof and forming the sample in a chamber located adjacent a gas conduit to the chromatograph column, moving said chamber when desired to bring the sample residue into contact with the carrier gas stream for injection into said column, and applying heat to said sample, so that the gas completely removes the sample from the walls of the capillary tube.

4. A method of introducing small samples of liquid into a carrier gas for passage through a gas chromatograph column, comprising the steps of first filling a capillary tube with a quantity of the liquid, then almost completely discharging the liquid from said tube by touching one end of said tube on an absorbent surface to leave a residue coating the walls of said tube, placing said tube containing the sample residue in a chamber located adjacent a gas conduit to the gas chromatograph column, moving said chamber when desired to bring the sample residue into contact with the carrier gas stream for injection into said column, and applying heat to said sample, so that the gas completely removes the sample from the walls of the capillary tube.

5. Apparatus for introducing small quantities of liquid into a carrier gas for passage through a gas chromatograph column, comprising a rotatable body having a pair of bores therein one of which is adapted to receive an open-ended tubular container containing the liquid sample, said body being movable so that either one of said bores may be connected into a conduit carrying the carrier gas whereby the liquid sample may be introduced into the carrier gas at will.

6. Apparatus for introducing small quantities of liquid into a carrier gas for passage through a gas chromatograph column, comprising a rotatable body having a pair of bores therein one of which is adapted to receive a micropipette having a capillary bore therethrough, said micropipette being held by a holder, means for securing said holder in said bore, means for moving said body for selectively connecting one of said bores into a conduit carrying the carrier gas whereby a liquid sample within said micropipette is introducible into the carrier gas at will.

7. Apparatus for introducing small quantities of liquid into a carrier gas for passage through a gas chromatograph column, comprising a rotatable body having a pair of bores therein one of which is adapted to receive a micropipette having a capillary bore therethrough, said micropipette being held by a holder which comprises a shank, one end of which is split to render it springy to grip said micropipette, means for securing said holder in said bore, means for moving said body for selectively connecting one of said bores into a conduit carrying the carrier gas whereby a liquid sample within said micropipette is introducible into the carrier gas at will.

8. Apparatus for introducing small quantities of liquid into a carrier gas for passage through a gas chromatograph column, comprising a rotatable body having a pair of bores therein one of which is adapted to receive a micropipette having a capillary bore therethrough, said micropipette being held by a holder comprising a shank, an externally screw-threaded enlarged portion on said shank, an internally screw-threaded recess in said rotatable body leading to said bore, said enlarged portion of said shank being screwed onto said recess, and means for moving said body, to connect either one of said bores into a conduit carrying the carrier gas whereby a liquid sample in said micropipette is introducible into the carrier gas at will.

9. Apparatus for introducing small quantities of liquid into a carrier gas for passage through a gas chromatograph column, comprising a chamber mounted to rotate about a substantially horizontal axis and containing two substantially horizontal bores, one for the reception of a micropipette, and both said bores being registerable in turn with a gas conduit conveying carrier gas to the chromatograph column, and means for rotating said chamber to connect the bore containing said micropipette with said gas conduit.

References Cited in the file of this patent

UNITED STATES PATENTS

| | | |
|---|---|---|
| 1,931,895 | Grote et al. | Oct. 24, 1933 |
| 2,864,254 | McDonald | Dec. 16, 1958 |
| 2,991,647 | Harris | July 11, 1961 |
| 3,002,387 | Michelette | Oct. 3, 1961 |